US012735919B2

(12) United States Patent
Lay et al.

(10) Patent No.: US 12,735,919 B2
(45) Date of Patent: Sep. 15, 2026

(54) BAR LOCK WITH ROLLER

(71) Applicant: Austin Hardware & Supply, Inc., Lee's Summit, MO (US)

(72) Inventors: David Lay, Buford, GA (US); Robert Walden, Buford, GA (US); Moises Beltran, Jr., Buford, GA (US)

(73) Assignee: Austin Hardware & Supply, Inc., Lee's Summit, MO (US)

( * ) Notice: Subject to any disclaimer, the term of this patent is extended or adjusted under 35 U.S.C. 154(b) by 105 days.

(21) Appl. No.: 18/203,813

(22) Filed: May 31, 2023

(65) Prior Publication Data

US 2023/0392419 A1 Dec. 7, 2023

Related U.S. Application Data

(60) Provisional application No. 63/348,300, filed on Jun. 2, 2022.

(51) Int. Cl.
*E05B 83/10* (2014.01)

(52) U.S. Cl.
CPC .................................... *E05B 83/10* (2013.01)

(58) Field of Classification Search
CPC ...... E05B 83/10; E05B 83/02; E05B 17/0025; E05C 19/003; E05C 19/04; Y10S 292/17; Y10S 292/32; Y10S 292/71; Y10T 292/23; Y10T 292/0811; Y10T 292/0824
See application file for complete search history.

(56) References Cited

U.S. PATENT DOCUMENTS 2,592,647 A * 4/1952 Black ...................... E05B 13/10 49/276
4,598,508 A * 7/1986 Baum ...................... E06B 9/01 292/259 R
6,860,530 B2 * 3/2005 Senn .................. E05B 17/0025 292/259 R
2009/0260185 A1 * 10/2009 Conner .................. E05B 83/10 16/251
2011/0232029 A1 * 9/2011 Hartgens ................ E05C 17/30 16/82
2016/0102482 A1 * 4/2016 Ehrlich .................. E05B 83/10 29/525.01
2022/0127886 A1 * 4/2022 Wanichsuksombat ...................... E05B 65/0888

(Continued)

FOREIGN PATENT DOCUMENTS

CN 217142164 * 8/2022

OTHER PUBLICATIONS

Translation of CN 217142164, Tang (Year: 2022).*

*Primary Examiner* — Christine M Mills
*Assistant Examiner* — Yahya Sidky
(74) *Attorney, Agent, or Firm* — Polsinelli PC

(57) ABSTRACT

A bar lock is described. The bar lock includes a bar. An upper strap is engaged to the bar. The upper strap is configured to engage to an upper hinge butt. A first is roller rotatably engaged to the bar. A lower strap is engaged to the bar. The lower strap is configured to engage to a lower hinge butt. A second roller is rotatably engaged to the bar. A handle bracket is affixed to the bar. A handle is pivotally engaged to the handle bracket. The first and second rollers are configured to prevent or reduce marring or rubbing damage to a door of a cargo area of a truck caused by a racking movement of sides of the truck.

22 Claims, 6 Drawing Sheets

(56) References Cited

U.S. PATENT DOCUMENTS

| | | | | |
|---|---|---|---|---|
| 2023/0068173 | A1* | 3/2023 | Zhang ..................... | E05B 83/10 |
| 2023/0340807 | A1* | 10/2023 | Kleynerman ........... | E05B 59/00 |

* cited by examiner

BAR LOCK WITH ROLLER

The present application claims priority to U.S. Provisional Patent Application No. 63/348,300 filed Jun. 2, 2022, which is hereby incorporated by reference.

FIELD OF INVENTION

The present invention relates to a bar lock with a roller.

BACKGROUND

Bar locks are commonly used to hold doors closed on a truck or commercial vehicle. The bar locks generally pivot or rotate to a holding position where a bar of the bar lock presses against a surface of the door to hold the door closed. A handle of the bar lock is rotatably connected to the bar, and the handle rotates into a bracket on the door. The handle may wedge into the bracket and drive the bar against the door.

Unfortunately, the closing force applied by a conventional bar lock to the door may rub or mar the surface of the door. This rubbing or marring may lead to unsightly blemishes or corrosion.

SUMMARY

A bar lock with a roller is described. The bar lock is used to hold or secure a door, ramp, or other closure of a truck, commercial vehicle, or trailer in a secured position.

The bar lock with roller includes a bar. The bar lock includes an upper strap and a lower strap that are engaged to the bar. The bar lock includes rollers rotatably engaged to a first end and a second end of the bar. The upper strap and the lower strap may hingedly engage or connect to hinge butts at an opening of the truck. A handle bracket is affixed to the bar. A handle is pivotally engaged to the handle bracket.

The rollers prevent or reduce marring or rubbing damage to the door or the ramp of a cargo area of the truck or trailer while still maintaining a closing force or pressure against the door or ramp. The rollers absorb movement of lateral sides or walls of the truck when the truck is driving. The rollers roll back and forth against an exterior of the door or ramp in order to reduce marring or other damage to the exterior of the door or ramp.

In one aspect, a bar lock is described. The bar lock includes a bar. An upper strap is engaged to the bar. The upper strap is configured to engage to an upper hinge butt. A first roller is rotatably engaged to the bar. A lower strap is engaged to the bar. The lower strap is configured to engage to a lower hinge butt. A second roller is rotatably engaged to the bar. A handle bracket is affixed to the bar. A handle is pivotally engaged to the handle bracket.

In another aspect, a bar lock is described. The bar lock includes a bar. The bar is configured to hingedly engage to a frame of an opening. A first roller is rotatably engaged to a first end of the bar. A second roller is rotatably engaged to a second end of the bar. The first roller and the second roller are configured to rotate in first direction generally perpendicular to a length of the bar, and the first roller and the second roller are configured to rotate in a second direction generally perpendicular to the length of the bar. A handle is pivotally engaged to the bar between the first roller and the second roller.

In another aspect, a marring resistant bar lock is described. The marring resistant bar lock includes a bar. An upper strap is configured to engage to an upper hinge butt. A roller is rotatably engaged to the bar. The roller includes a central opening. The bar sized to fit into the central opening. The roller comprising an exterior surface of a polymeric or a plastic material. A lower strap is configured to engage to a lower hinge butt. A handle is pivotally engaged to the bar. The exterior surface of the roller is configured to rotate against a door or ramp and not mar the door or ramp.

DETAILED DESCRIPTION OF INVENTION

Figure 1:
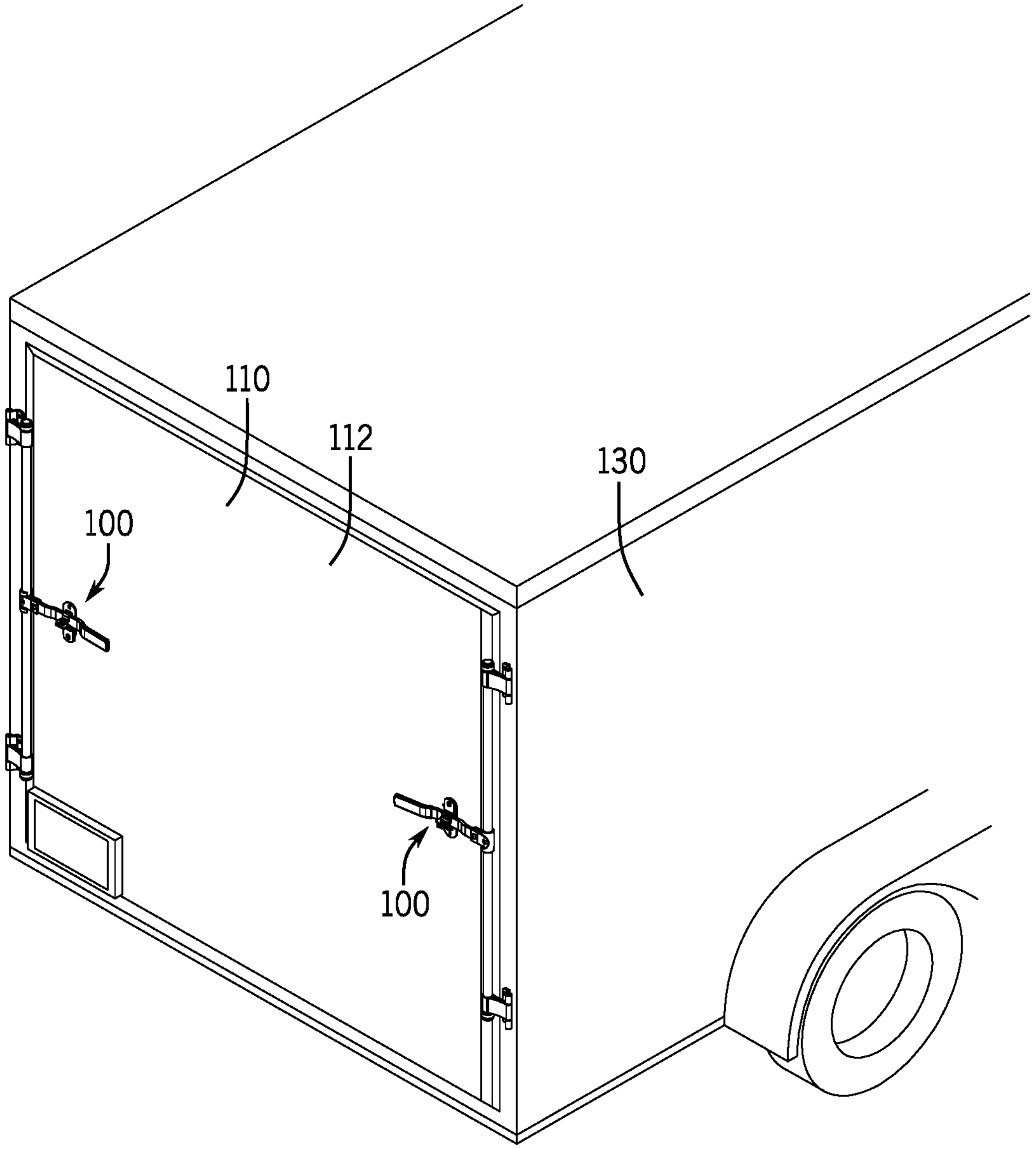
FIG. 1 is a perspective view of the bar lock installed on the door of the truck.
Figure 2:
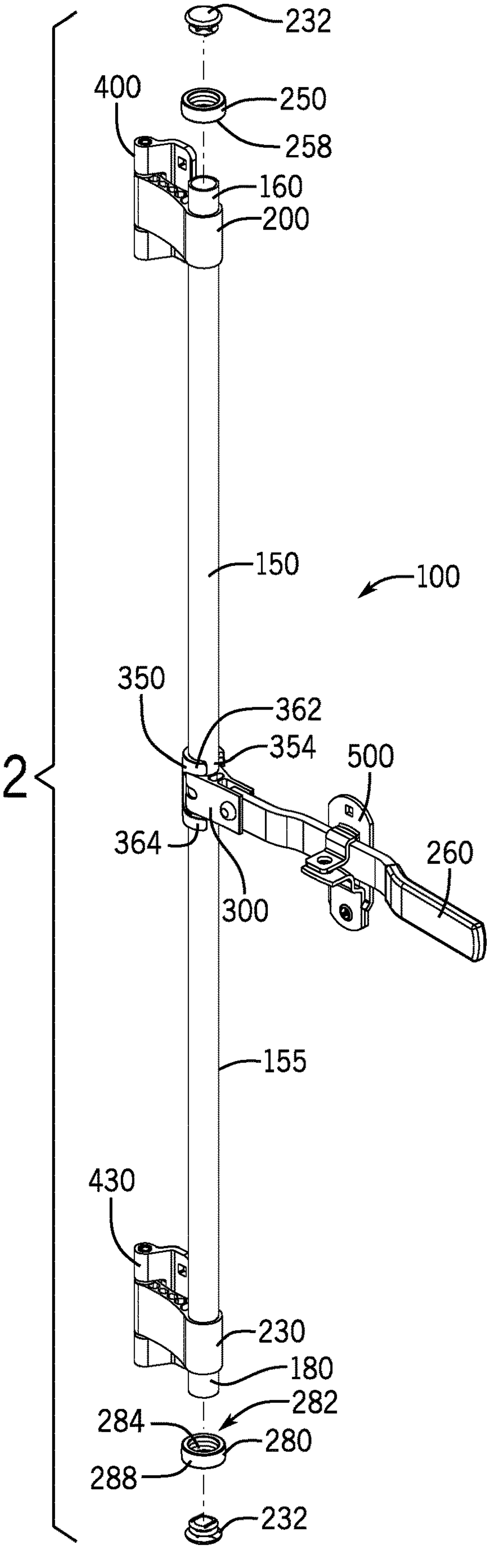
FIG. 2 is an exploded view of the bar lock.
Figure 3:
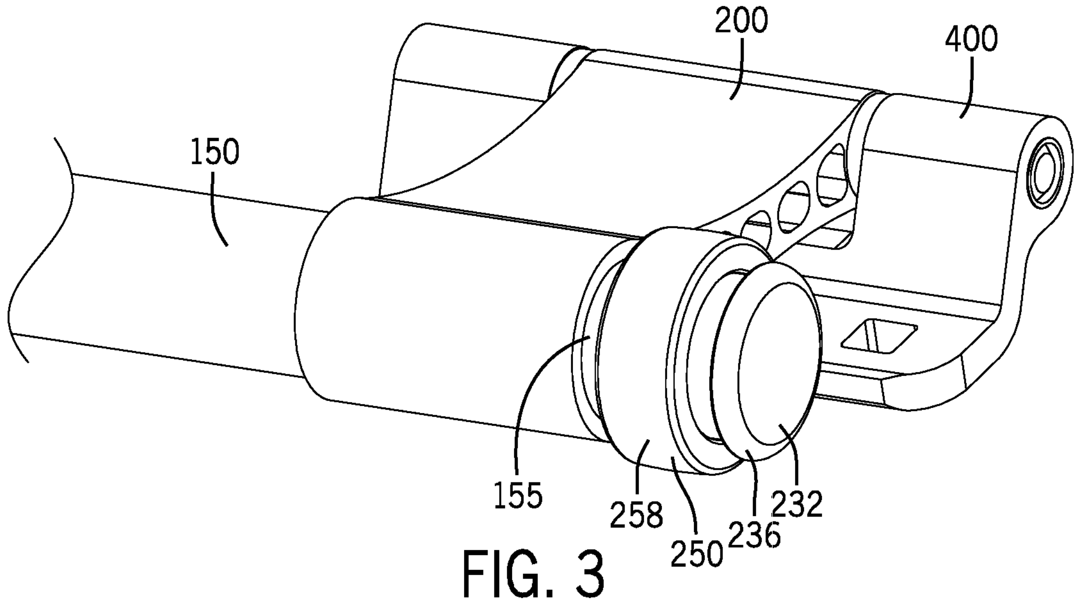
FIG. 3 is a perspective view of the first end of the bar lock.
Figure 4:
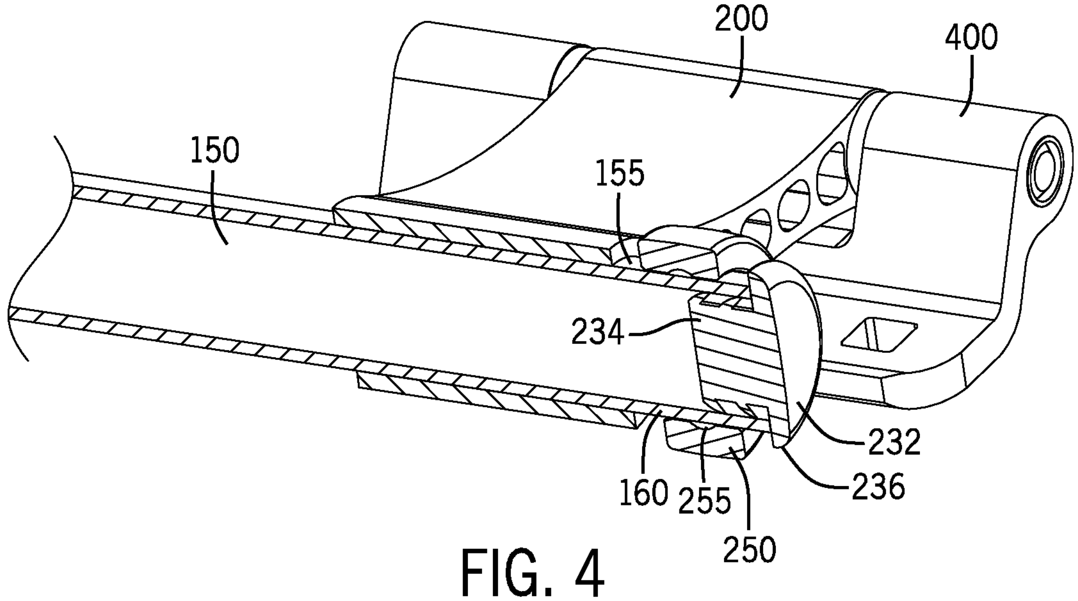
FIG. 4 is a sectional view of the first end of the bar lock.
Figure 5:
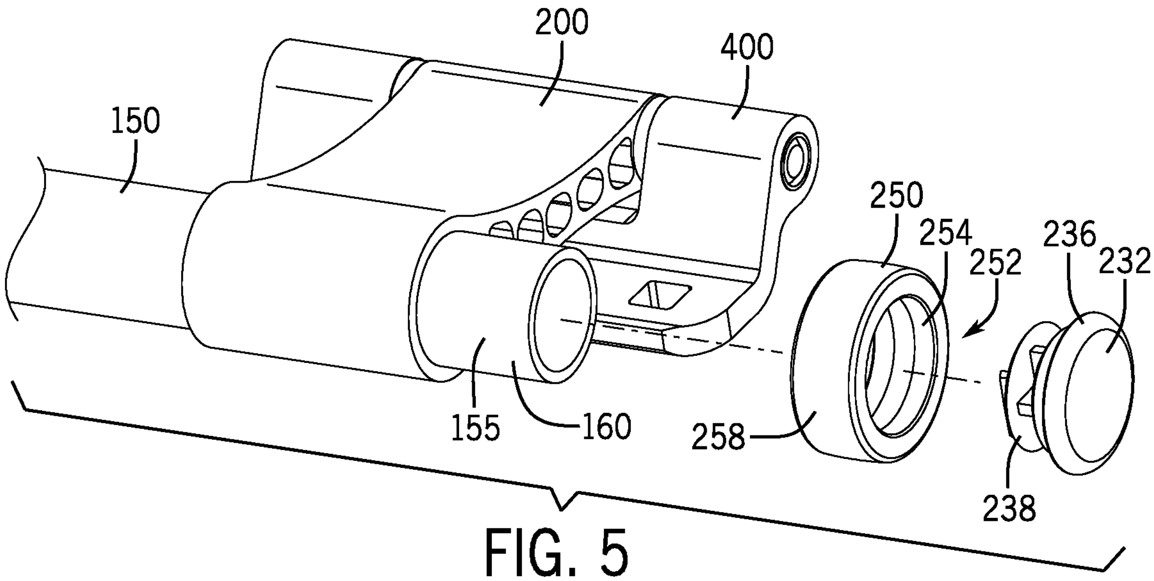
FIG. 5 is an exploded view of the first end of the bar lock.
Figure 6:
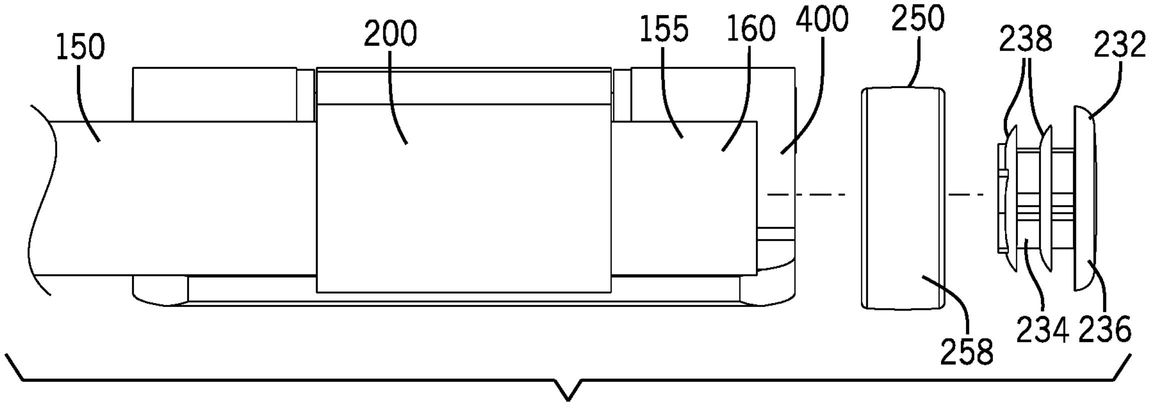
FIG. 6 is an exploded view of the first end of the bar lock.
Figure 7:
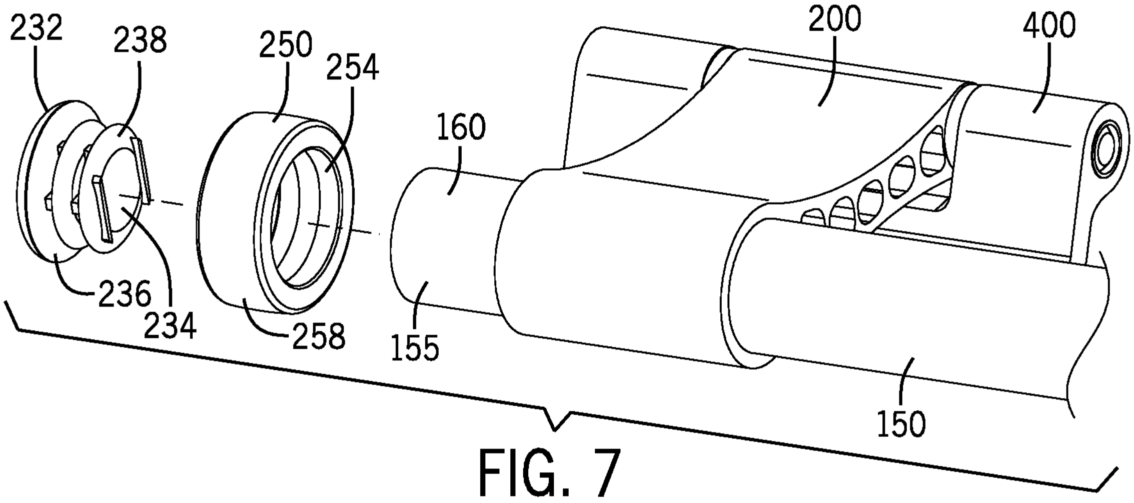
FIG. 7 is an exploded view of the first end of the bar lock.
Figure 8:
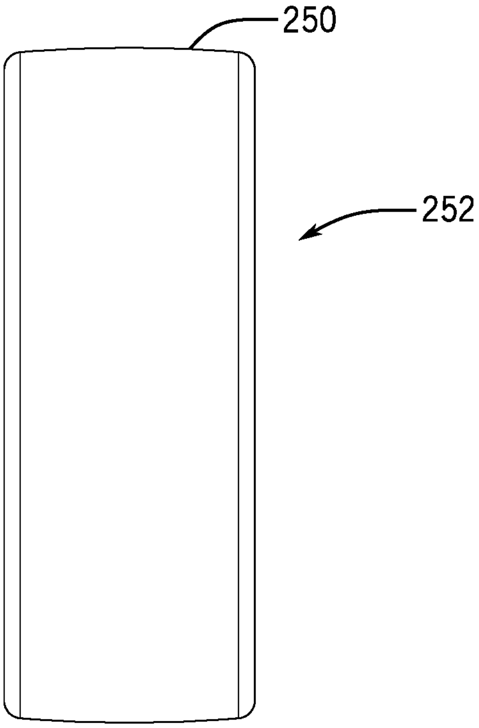
FIG. 8 is a side view of the roller.
Figure 9:
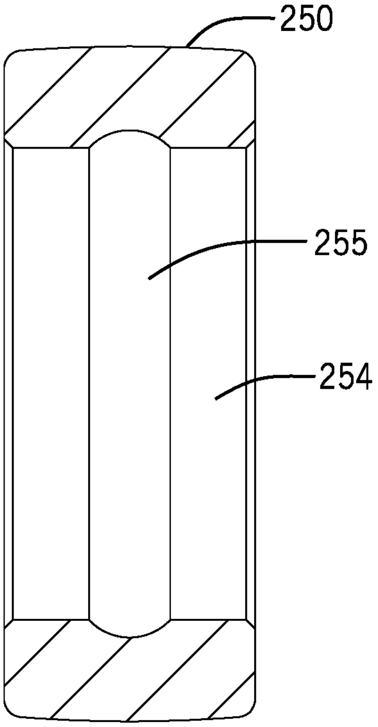
FIG. 9 is a sectional view of the roller.

A bar lock 100 is shown with respect to FIGS. 1-10. The bar lock 100 is used to hold and/or secure a door, ramp, or other closure of a truck, commercial vehicle, or trailer in a secured position. With respect to FIG. 1, the bar lock 100 is shown holding a door 110 in a closed position. The door 110 is over a rear opening of a truck 130. The door 110 is hingedly engaged to the truck 130. In this aspect, the door 110 swings up and down between open and closed positions. In other aspects, the door 110 may swing horizontally between open and closed positions. In other aspects, multiple bar locks 100 may be used with a single door or with multiple doors.

In this aspect, the bar lock 100 generally includes a bar 150, an upper strap 200, a first roller 250, an upper hinge butt 400, a lower strap 230, a second roller 280, a lower hinge butt 430, a handle 260, and a handle bracket 300.

The first roller 250 is generally circular with a central opening 252. The first roller 250 includes an interior surface 254 and an exterior surface 258. The first roller 250 is rotatably engaged to a first end 160 of the bar 150. The second roller 280 is also generally circular with a central opening 282. The second roller 280 includes an interior surface 284 and an exterior surface 288. The second roller 280 is rotatably engaged to a second end 180 of the bar 150.

During assembly, the bar 150 fits into or passes through the central opening 252 of the first roller 250 and the central opening 282 of the second roller 280. The interior surfaces 254 and 284 of the first roller 250 and the second roller 280 rotate against the outer surface 155 of the bar 150. The exterior surfaces 258 and 288 of the first roller 250 and the second roller 280 rotate against an exterior surface 112 of the door 110 and apply closing pressure against the door 110. In this aspect, the interior surfaces 254 and 284 include a groove 255 to receive a lubricant. In other aspects, bearings or other rotatable connections may be utilized. In other aspects, lubricating washers or bushings may be utilized. In other aspects, additional rollers may be utilized in addition to the to the first roller 250 and the second roller 280. In other aspects, a single roller may be utilized.

The first and second rollers 250 and 280 reduce or prevent the marring on the exterior surface 112 of the door 110. When the truck 130 is driving, lateral sides or walls of the cargo area may flex or bend in a side to side manner. For example, a right side or wall of the cargo area may move to the left as the left side or wall of the cargo area also moves to the left. This is called "racking" in the industry. The upper hinge butt 400 and the lower hinge butt 430 are affixed to the sides or walls at the opening or frame of the cargo area and move with the sides or walls. The door 110 is generally fixed to a floor of the cargo area of the truck 130 and generally remains stationary relative to the truck 130. The first and second rollers 250 and 280 may roll against the exterior surface 112 of the door 110 as the lateral sides or walls of the cargo area are "racking," thus preventing or reducing the marring on the exterior surface 112 of the door 110. The exterior surface 258 of the first roller 250 urges against the exterior surface 112 of the door 110. Similarly, the exterior surface 288 of the second roller 280 urges against the exterior surface 112 of the door 110. The first and second rollers 250 still apply a closing pressure against the door 110 while rotating relative to the bar 150. The closing pressure maintains the door 110 in the closed position and may compress gaskets around the opening of the cargo area. The first and second rollers 250 and 280 may rotate against the exterior surface 112 of the door 110 as the lateral sides or walls of the cargo area are "racking." The first and second rollers 250 and 280 may rotate in a direction generally perpendicular to a length of the bar 150.

In this aspect, a cap 232 fastens to the first end 160 of the bar 150 to secure the first roller 250 to the first end 160. Similarly, another cap 232 fastens to the second end 180 of the bar 150 to secure the second roller 280 to the second end 180. In this aspect, the cap 232 includes a flange portion 234 and an outer portion 236. The flange portion 234 extends from the outer portion 236. The flange portions 234 inserts into hollow openings of the first end 160 and the second end 180 of the bar 150. The flange portions 234 may press-fit into the hollow openings. In this aspect, the flange portion 234 includes one or more ribs 238 that extend outwardly to contact or fit against walls of the hollow opening of the first end 160 or second end 180 of the bar 150. The ribs 238 may bend or deform to hold against the walls of the hollow openings. The ribs 238 generally include a smaller outer diameter than an outer diameter of the outer portion 236. In other aspects, fasteners may pass through the flange portion 234 and the first end 160 and the second end 180 to secure the caps 232 to the first end 160 and the second end 180. In other aspects, fasteners may hold the first roller 250 to the first end 160 and the second roller 280 to the second end 180.

The outer diameter of the outer portions 236 of the caps 232 is larger than the central opening 252 of the first roller 250 and the central opening 282 of the second roller 280. Thus, the outer portions 236 of the caps 232 generally prevent the first roller 250 and the second roller 280 from coming off of the bar 150.

In this aspect, the first and second rollers 250 and 280 are positioned on lower and upper sides of the bar 150. In this aspect, the first roller 250 is positioned between the cap 232 and the upper strap 200, and the second roller 280 is positioned between the cap 232 and the lower strap 230. In other aspects, additional rollers, such as a centrally positioned roller, may also be employed with or without the first and second rollers 250 and 280. Thus, the bar lock 100 may include 1, 2, 3 or more of the rollers. Further, in other aspects, the rollers 250 and 280 may be positioned interior to the upper strap 200 and the lower strap 230. Further, in other aspects, the bar lock 100 may include a roller, wheel, caster, etc. engaged to an end of the bar 150. For example, the roller or wheel may be engaged to the end of the bar 150 via an axle and fastener. The axle may be arranged generally parallel to a length of the bar 150 and engaged to the end of the bar 150 such that the roller or wheel rotates or pivots about the axle.

The handle 260 pivots or rotates relative to the bar 150. The bar 150, the upper strap 200, and the lower strap 230 pivot or hingedly move relative to the upper hinge butt 400 and the lower hinge butt 430. The upper hinge butt 400 and the lower hinge butt 430 are typically fastened or attached to sidewalls or an opening frame of the truck or trailer.

The handle 260 is pivotally or rotatably engaged to the handle bracket 300. The handle bracket 300 is affixed to the bar 150. In this aspect, the handle bracket 300 is affixed to a central portion of the bar 150. In other aspects, the handle bracket 300 may be affixed to the bar 150 in an off-center position, such as closer to either of the upper strap 200 or the lower strap 230.

In certain installations of the bar lock 100, the bar 150 may bend or bow under the closing force of the bar lock 100, which may cause a central portion of the bar lock 100 to rub against the door 110. In order to reduce possible damage to the door 110, the bar lock 100 may include a support 350. In this aspect, the support 350 is fitted over the handle 260. The support 350 may be fitted to the handle 260 proximate to the handle bracket 300. The support 350 includes a semi-tubular shape having an open side 354 and hollow interior to receive the handle 260. With respect to FIG. 10, the support 350 includes a contact surface 358 that, in certain installations, may rub or contact the exterior surface 112 of the door 110. The contact surface 358 provides a non-marring point of contact for the bar lock 100. The contact surface 358 is in addition to the first and second rollers 250 and 280. The support 350 may be formed from nylon or other polymeric or plastic material to provide a bearing surface to contact the exterior surface 112 and prevent the handle bracket 300 and/or a central portion of the bar 150 from marring the exterior surface 112 of the door 110. The support 350 includes an upper extending portion 362 and lower extending portion 364. The handle bracket 300 fits between the upper extending portion 362 and the lower extending portion 364. This arrangement prevents the support 350 from sliding down the bar 150. The upper extending portion 362 and the lower extending portion 364 may include a curved shape to wrap against the bar 150.

The upper strap 200 is affixed to an upper portion of the bar 150, and the lower strap 230 is affixed to a lower portion of the bar 150. The handle bracket 300 is affixed to the bar 150 between the upper strap 200 and the lower strap 230. The upper strap 200 is hingedly engaged to the upper hinge butt 400, while the lower strap 230 is hingedly engaged to the lower hinge butt 430. During installation, the upper hinge butt 400 and the lower hinge butt 430 are affixed to the truck 130 along its rear opening. Thus, the bar 150 pivots or hinges relative to the upper hinge butt 400, the lower hinge butt 430, and the truck 130, while the handle 260 pivots or rotates relative to the bar 150. In other aspects, additional hinge butts and hinge straps may be employed by the bar lock 100.

The handle 260 pivots or rotates relative to the bar 150 to engage and disengage the handle 260 from a hasp 500. The handle 260 includes a grip portion 263 opposite of a connecting portion 267. The connecting portion 267 of the handle 260 engages to the handle bracket 300.

The hasp 500 is mounted on an exterior surface 112 of the door 110. The hasp 500 includes a bracket portion 510, which receives a central portion 265 of the handle 260. When the handle 260 is moved downward to the closed position, the handle 260 wedges into the hasp 500, which drives the bar 150 toward the closed position. In this aspect, the hasp 500 includes a rotatable locking portion 550, which is configured to rotate over the central portion 265 of the handle 260 and prevent the handle 260 from moving upward to an unlocked position. The bracket portion 510 and the rotatable locking portion 550 may include complementary lock openings to receive a pad lock or other lock.

The upper strap 200 is engaged to the upper hinge butt 400, while the lower strap 230 is engaged to the lower hinge butt 430. In this aspect, hinge pins hold the upper strap 200 engaged with the upper hinge butt 400 and the lower strap 230 engaged to the lower hinge butt 430, respectively.

In this aspect, the bar 150 includes a generally circular or round cross-section. The bar 150 is an elongate member. The bar 150 may include a hollow construction formed from an extrusion process. The bar 150 includes a length sufficient to provide a closing force to the door 110. The bar 150 includes the outer surface 155. The bar 150 may be formed from an extrusion process.

The upper strap 200 forms an upper cylindrical passage, while the lower strap 230 forms a lower cylindrical passage. During assembly, the bar 150 is passed through the upper cylindrical passage and the lower cylindrical passage and the bar 150 is welded to the upper strap 200 and the lower strap 230.

Figure 10:
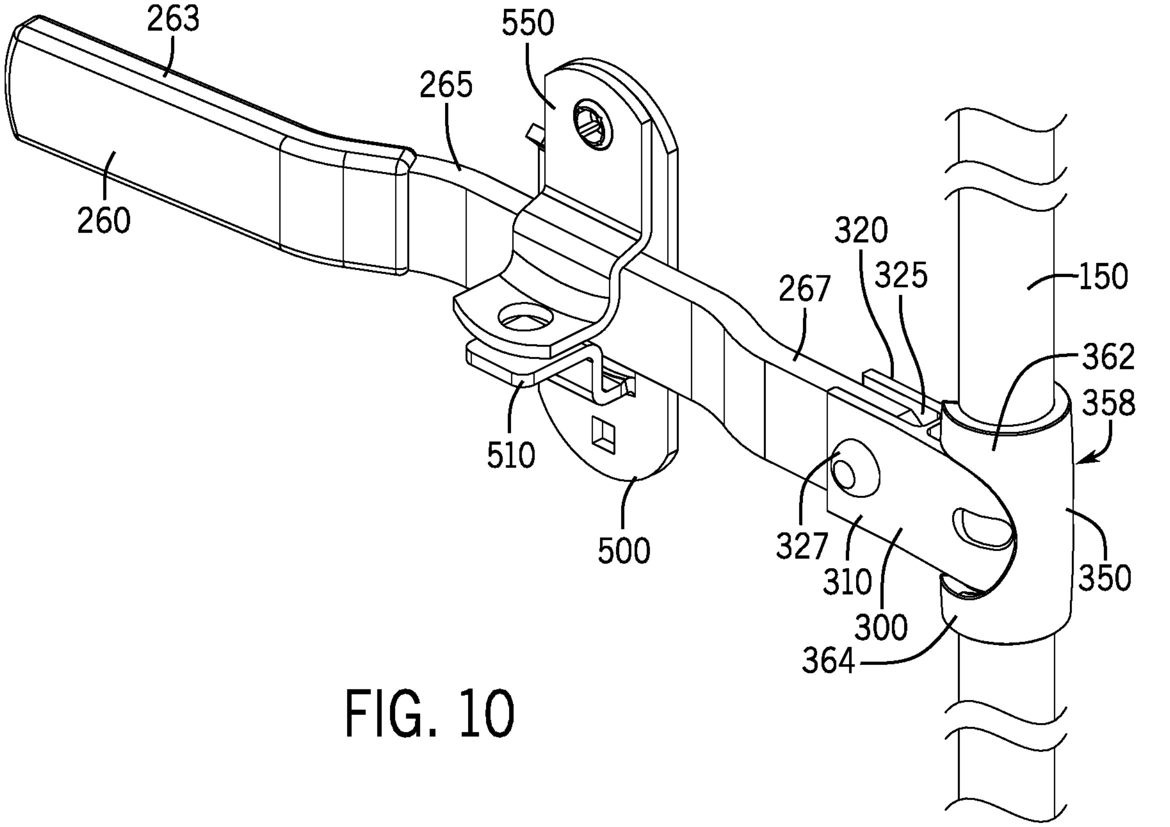
FIG. 10 is a view of the handle.

With reference to FIG. 10, the handle bracket 300 will now be described. The handle bracket 300 includes a first arm 310 and a second arm 320 that forms a slot 325 which receives the connecting portion 267 of the handle 260. A fastener 327 rotatably holds or engages the connecting portion 267.

When the handle 260 is moved downward and forced inward into the bracket portion 510, the exterior surface 258 of the first roller 250 and the exterior surface 288 of the second roller 280 are urged against the exterior surface 112 of the door 110, which pushes and/or maintains the door 110 in the closed position. The first roller 250 and the second roller 280 are configured to spin or rotate relative to the bar 150. A force from the handle 260 wedging into the bracket portion 510 of the hasp 500 is transferred to a central portion of the bar 150 via the handle bracket 300, and the bar 150 is urged inward toward the door 110, which forces the exterior surfaces 258 and 288 against the exterior surface 112 of the door 110

The bar lock 100 and its components may be formed from tempered aluminum, such as, for example 6061-T6 aluminum alloy. The first roller 250 and the second roller 280 may be formed from or include a non-marring material, such as a nylon or other polymeric or plastic material. In other aspects, the first roller 250 and the second roller 280 may include a metallic base portion that is coated with an outer layer of the non-marring material. The non-marring material is generally formed from softer material than the exterior surface 112 of the door 110, such that the exterior surface 112 of the door 110 is not scuffed or damaged by contact from the first roller 250 and the second roller 280.

Several of the components of the bar lock 100 may be formed from extrusion processes. For example, the bar 150, the upper strap 200, the lower strap 230, and the handle bracket 300 may be formed from extrusion processes. In certain aspects, the upper strap 200 and the lower strap 230 are identical and may be formed from the same extrusion process. Multiple upper straps 200 and lower straps 230 may be cut from extruded stock of the straps.

During the manufacture of the bar lock 100, the upper strap 200 and the lower strap 230 are positioned on the bar 150 with the handle bracket 300 positioned on the bar 150 between the upper strap 200 and the lower strap 230.

As such, it should be understood that the disclosure is not limited to the particular aspects described herein, but that various changes and modifications may be made without departing from the spirit and scope of this novel concept as defined by the following claims. Further, many other advantages of applicant's disclosure will be apparent to those skilled in the art from the above descriptions and the claims below.

What is claimed is:

1. A bar lock, comprising:
- a bar;
- an upper strap engaged to the bar, the upper strap configured to engage to an upper hinge butt;
- a first roller rotatably engaged to the bar;
- a lower strap engaged to the bar, the lower strap configured to engage to a lower hinge butt;
- a second roller rotatably engaged to the bar;
- a handle bracket affixed to the bar;
- a handle pivotally engaged to the handle bracket; and wherein exterior surfaces of the first roller and the second roller are configured to roll against an exterior surface of a door or a ramp; and,
- the bar, the upper strap, and the lower strap are configured to pivot or hingedly move relative to the upper hinge butt and the lower hinge butt to urge the exterior surfaces of the first roller and the second roller against the exterior surface of the door or the ramp.

2. The bar lock according to claim 1, wherein the first roller and the second roller are generally circular with a central opening.

3. The bar lock according to claim 2, wherein the bar passes through the central opening of the first roller and the central opening of the second roller.

4. The bar lock according to claim 1, wherein interior surfaces of the first roller and the second roller rotate against an outer surface of the bar.

5. The bar lock according to claim 1, wherein the exterior surfaces of the first roller and the second roller are configured to rotate against and roll back and forth relative to the exterior surface of the door or a ramp.

6. The bar lock according to claim 1, wherein interior surfaces of the first roller and the second roller includes a groove configured to receive a lubricant.

7. The bar lock according to claim 1, wherein the first and second rollers are configured to prevent or reduce marring or rubbing damage to a door or ramp of a cargo area of a truck while still maintaining a closing force or pressure against the door or ramp.

8. The bar lock according to claim 1, wherein the first and second rollers are configured to absorb movement of lateral sides or walls of a truck when the truck is driving.

9. The bar lock according to claim 1, wherein the first and second rollers are configured to prevent or reduce marring or rubbing damage to a door or ramp of a cargo area of a truck caused by a racking movement of sides of the truck.

10. The bar lock according to claim 1, wherein the first roller comprising a central opening, the second roller comprising a central opening, and the bar sized to fit into both of the central openings.

11. The bar lock according to claim 1, wherein a first cap fastens to a first end of the bar to secure the first roller to the first end, and a second cap fastens to a second end of the bar to secure the second roller to the second end.

12. The bar lock according to claim 11, wherein the first roller is positioned between the first cap and the upper strap, and the second roller is positioned between the second cap and the lower strap.

13. The bar lock according to claim 11, the first cap includes a flange portion and an outer portion, wherein the flange portion extends from the outer portion, and the flange portion inserts into a hollow opening of the first end of the bar.

14. The bar lock according to claim 13, wherein the flange portion includes one or more ribs that extend outwardly to contact or fit against walls of the hollow opening of the first end of the bar.

15. The bar lock according to claim 13, wherein the first roller is positioned between the cap and the upper strap, wherein an outer diameter of the outer portion of the cap is larger than a central opening of the first roller, and the outer portion of the cap holds the first roller to the bar.

16. The bar lock according to claim 1, wherein a support is fitted to the handle proximate the handle bracket, and the support includes a contact surface.

17. The bar lock according to claim 16, wherein the support includes a semi-tubular shape having an open side and hollow interior to receive the handle.

18. A truck or trailer comprising the bar lock according to claim 1.

19. The truck or trailer according to claim 18, wherein the upper hinge butt and the lower hinge butt are fastened to a frame of the truck or trailer, a hasp is fastened to a door or ramp of the truck or trailer, and the hasp is configured to receive the handle.

20. A bar lock, comprising:
a bar;
an upper strap engaged to the bar, the upper strap configured to engage to an upper hinge butt;
a lower strap engaged to the bar, the lower strap configured to engage to a lower hinge butt;
a first roller rotatably engaged to a first end of the bar;
a second roller rotatably engaged to a second end of the bar;
the first roller and the second roller configured to rotate in a first direction generally perpendicular to a length of the bar and to roll against an exterior surface of a door or a ramp of a vehicle;
the first roller and the second roller configured to rotate in a second direction generally perpendicular to the length of the bar and to roll against the exterior surface of the door or a ramp of the vehicle;
a handle pivotally engaged to the bar between the first roller and the second roller; and
the bar, the upper strap, and the lower strap are configured to pivot or hingedly move relative to the upper hinge butt and the lower hinge butt to urge exterior surfaces of the first roller and the second roller against the exterior surface of the door or the ramp.

21. A marring-resistant bar lock, comprising:
a bar;
an upper strap configured to engage to an upper hinge butt;
a roller rotatably engaged to the bar;
the roller comprising a central opening, the bar sized to fit into the central opening, the roller comprising an exterior surface of a polymeric or a plastic material;
a lower strap configured to engage to a lower hinge butt;
a handle pivotally engaged to the bar;
the roller is configured to roll against an exterior surface of a door or a ramp; and
the bar, the upper strap, and the lower strap are configured to pivot or hingedly move relative to the upper hinge butt and the lower hinge butt to urge an exterior surface of the roller against the exterior surface of the door or the ramp.

22. A bar lock, comprising:
a bar;
a strap engaged to the bar, the strap configured to engage to a hinge butt;
a roller rotatably engaged to the bar;
a handle bracket affixed to the bar;
a handle pivotally engaged to the handle bracket; and wherein an exterior surface of the roller is configured to roll against an exterior surface of a door or a ramp; and
the bar and the strap are configured to pivot or hingedly move relative to the hinge butt to urge the exterior surface of the roller against the exterior surface of the door or the ramp.

* * * * *